US010820284B2

(12) United States Patent
Monajemi et al.

(10) Patent No.: US 10,820,284 B2
(45) Date of Patent: Oct. 27, 2020

(54) TBTT SYNCHRONIZATION BETWEEN WI-FI ACCESS POINTS

(71) Applicant: Cisco Technology, Inc., San Jose, CA (US)

(72) Inventors: Pooya Monajemi, Irvine, CA (US); Amir Hosein Kamalizad, Menlo Park, CA (US); Vishal Satyendra Desai, San Jose, CA (US); Brian Donald Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/120,124

(22) Filed: Aug. 31, 2018

(65) Prior Publication Data

US 2020/0077348 A1 Mar. 5, 2020

(51) Int. Cl.
*H04W 56/00* (2009.01)
*H04W 48/16* (2009.01)
*H04W 72/04* (2009.01)
*H04L 5/00* (2006.01)
*H04W 8/00* (2009.01)
*H04W 80/02* (2009.01)
*H04L 1/00* (2006.01)

(52) U.S. Cl.
CPC ......... *H04W 56/001* (2013.01); *H04L 5/005* (2013.01); *H04W 8/005* (2013.01); *H04W 48/16* (2013.01); *H04W 72/0446* (2013.01); *H04L 1/0061* (2013.01); *H04W 80/02* (2013.01)

(58) Field of Classification Search
CPC ... H04W 56/001; H04W 8/005; H04W 48/16; H04W 72/0446; H04W 80/02; H04L 5/005; H04L 1/0061
See application file for complete search history.

(56) References Cited

U.S. PATENT DOCUMENTS

| | | | |
|---|---|---|---|
| 8,848,669 B2 | 9/2014 | Meier et al. | |
| 9,380,578 B2 | 6/2016 | Fontaine et al. | |
| 9,839,050 B2 | 12/2017 | Zhou et al. | |
| 9,888,503 B2 | 2/2018 | Wang et al. | |
| 9,906,995 B2 | 2/2018 | Roy et al. | |
| 2007/0014269 A1* | 1/2007 | Sherman | H04J 3/0661 370/338 |
| 2009/0279514 A1* | 11/2009 | Seok | H04W 74/0816 370/336 |
| 2018/0035331 A1* | 2/2018 | Sundman | H04L 1/00 |
| 2018/0249437 A1* | 8/2018 | Lindskog | H04W 64/00 |
| 2019/0320407 A1* | 10/2019 | Goyal | H04W 8/005 |

* cited by examiner

*Primary Examiner* — Dady Chery

(74) *Attorney, Agent, or Firm* — Patterson + Sheridan, LLP

(57) ABSTRACT

In one embodiment, a method is performed. A first wireless access point (AP) device may generate a timing synchronization frame. The timing synchronization frame may include a target beacon transmission time (TBTT) associated with the first wireless AP device. The first wireless AP device may transmit the timing synchronization frame to a second wireless AP device. The first and second wireless AP devices may be synchronized using the timing synchronization frame.

20 Claims, 5 Drawing Sheets

TBTT SYNCHRONIZATION BETWEEN WI-FI ACCESS POINTS

TECHNICAL FIELD

The present disclosure generally relates to wireless connectivity.

BACKGROUND

A wireless networking client device, such as a station (STA), may establish a connection with an access point (AP) device in a wireless network by discovering available networks and assessing the quality of available links. The client device may then select an AP or network that may deliver a connection that satisfies a quality of service (QoS) criterion, for example. The client device may be authenticated to the network.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
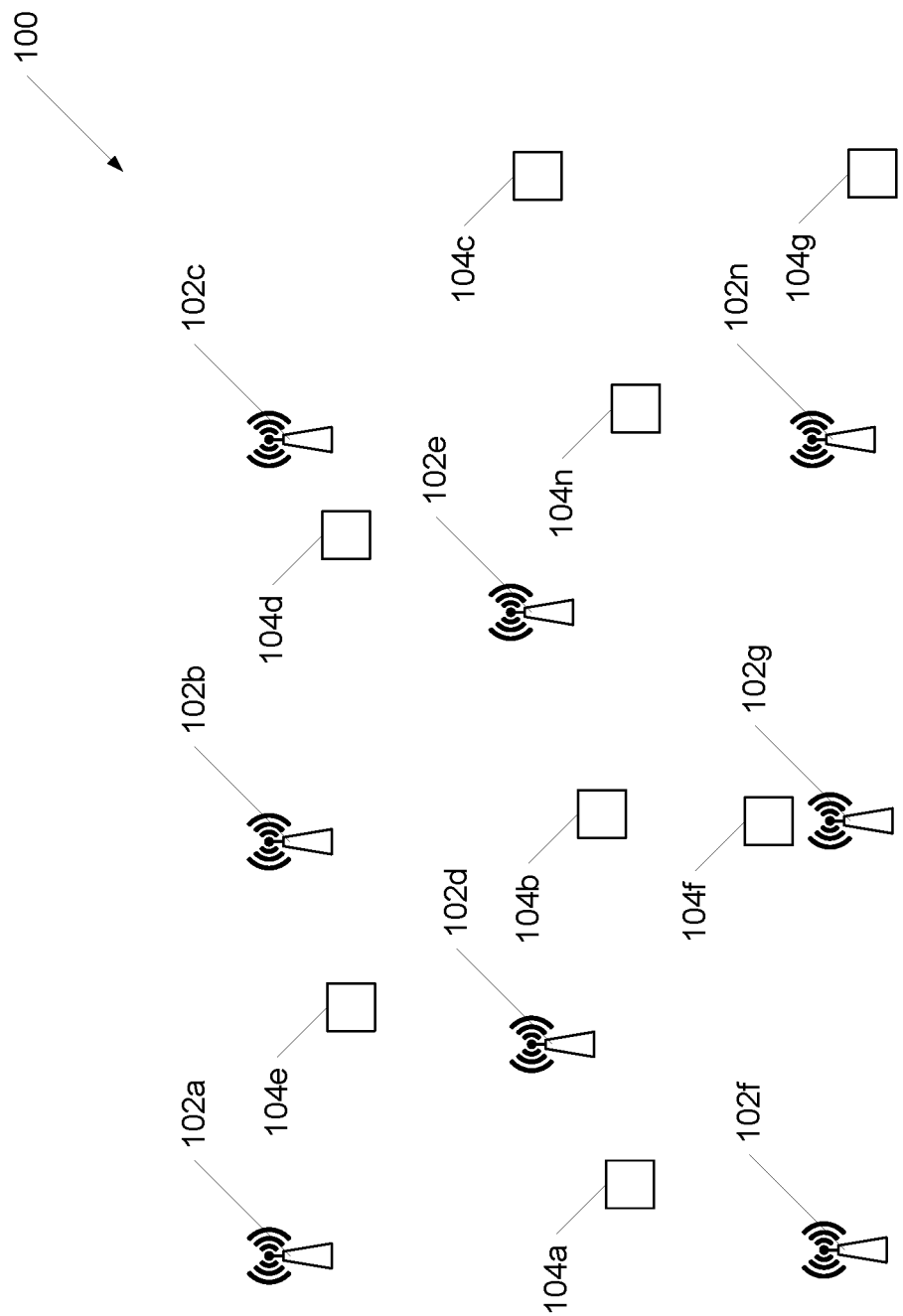
FIG. 1 is a diagram that illustrates an example wireless network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for transmitting a target beacon transmission time (TBTT) associated with a wireless access point (AP) device to neighboring AP devices. TBTTs associated with neighboring AP devices may be embedded in a FILS discovery frame.

In an embodiment, a first wireless AP device may generate a timing synchronization frame. The timing synchronization frame may include a target beacon transmission time (TBTT) associated with the first wireless AP device. The first wireless AP device may transmit the timing synchronization frame to a second wireless AP device. The first and second wireless AP devices may be synchronized using the timing synchronization frame.

Example Embodiments

FIG. 1 illustrates an example wireless network 100. The wireless network 100 may include various wireless network nodes such, as one or more wireless access point (AP) devices 102a, 102b, ... 102n (collectively referred to as AP devices 102) and one or more wireless devices, such as stations (STAs) 104a, 104b, ..., 104n (collectively referred to as STAs 104). The AP devices 102 may each incorporate one or more radios for sending and receiving signals using one or more radio access technologies (RATs) and/or frequency channels.

An AP device 102 may provide data and/or telephonic services to the STAs 104. For example, the wireless network 100 may provide a communication channel that a STA 104 may use to access the AP device 102. The wireless network 100 may operate in accordance with IEEE 802.11 standards. For example, in some implementations, the RAT utilized by the wireless network 100 may conform to 802.11 standards. The wireless network 100 may include a Wireless Fidelity (Wi-Fi) network. The wireless network 100 may include a short-range communication network with a communication range from several feet to a few hundred feet.

The wireless network 100 may be a secured network. For example, in some implementations, the wireless network 100 may use login credentials to provide access to the wireless network 100. The wireless network 100 may be an enterprise network that may be controlled by an enterprise operator. The enterprise operator may issue (e.g., generate and/or distribute) login credentials for the wireless network 100 to authorized users (e.g., to users employed by the enterprise, and/or to users that are customers or clients of the enterprise). In some implementations, the login credentials may include a username and a password. In some implementations, the login credentials may include tokens. The wireless network 100 may use two-factor authentication (e.g., a password and a token).

Before the AP device 102 provides data services to a STA 104, the STA 104 may establish connectivity with the AP device 102. For example, the STA 104 may search for an available AP device and/or an available network.

One proposed approach to connectivity, known as optimized connectivity experience (OCE), may facilitate searching for and discovering AP devices and networks and establishing connectivity when moving within and between Wi-Fi networks, even in densely populated environments. The user experience may be enhanced by reducing management traffic. The exchange of probe requests and responses that may be initiated by users trying to join a network may be reduced.

In some embodiments, a node, such as the AP device 102a, may advertise its presence using a broadcast frame, such as aNeighbor Discovery Packet (NDP), transmitted over a medium. Other nodes, such as other AP devices 102 or STAs 104, may be listening to the medium and may receive the broadcast frame. Nodes that receive the broadcast frame may decode it to determine information regarding the broadcasting node, e.g., the AP device 102a.

In some implementations of the OCE, the AP device 102a may store and announce a list of neighboring AP devices with their respective target beacon transmission times (TBTTs). This information may allow a client device, such as a STA 104, to scan for neighboring AP devices efficiently.

The AP device 102a may transmit its own TBTT information to its neighbors using a variety of 802.11 frames, hereafter collectively referred to as timing synchronization frames. Examples of such 802.11 frames may include, but are not limited to, neighbor discovery packets (NDPs), beacon frames, and/or probe responses that may be communicated between radios. Timing synchronization frames may carry TBTT information.

Figure 2:
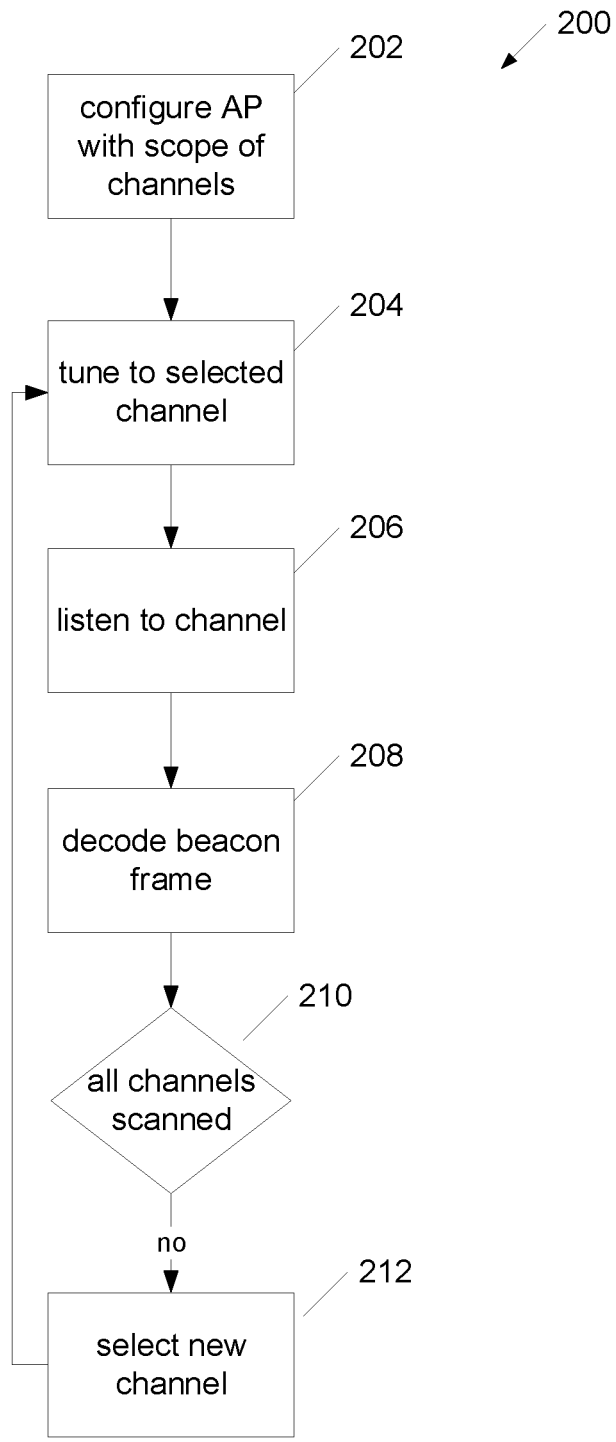
FIG. 2 is a flow diagram illustrating an example process for performing an off-channel scan.

In some implementations, the AP device 102a may perform an off-channel scan to find its neighbors and determine their TBTT information. FIG. 2 is a flow diagram illustrating an example process 200 for performing an off-channel scan. At 202, the AP device 102a may be configured with a scope of channels to scan. For example, the AP device 102a may be configured to scan and audit regulatory channels. Channels that are commonly used may be scanned and audited more frequently. The AP device 102a may be configured to scan and audit all channels. The configuration of the AP device 102a may be stored, for example, in a radio profile.

At 204, the AP device 102a may cause its radio to select and tune to a channel in the scope of channels. At 206, the AP device 102a may listen to the channel to determine whether it can detect any beacon frames or other timing synchronization frames transmitted by other AP devices 102 within range. Beacon transmission may occur, for example, once every 100 time units (TUs). Each TU may be 1.024 milliseconds. The AP device 102a may have a monitor radio or may be capable of serving traffic that is relatively insensitive to latency. To ensure that it receives a neighboring AP device's beacon frame, the AP device 102a may have at least 100 TUs in off-channel dwells.

If the AP device 102a receives a beacon frame or other timing synchronization frames, it may decode the frame at 208 to determine information about the AP device 102 that transmitted the beacon frame. This information may include TBTT information. At 210, the AP device 102a may determine whether it has scanned all of the channels in its configured scope of channels. If so, the process 200 may end. If not, the AP device 102a may select a new channel at 212 and may tune to the selected channel at 204.

In some implementations, the AP device 102a may use a neighbor discovery packet (e.g., NDP) via off-channel transmissions cycling through a list of frequencies that are allowed within a regulatory domain. The AP device 102a may use a neighbor discovery packet to advertise its TBTT to its neighboring access nodes.

Figure 3:
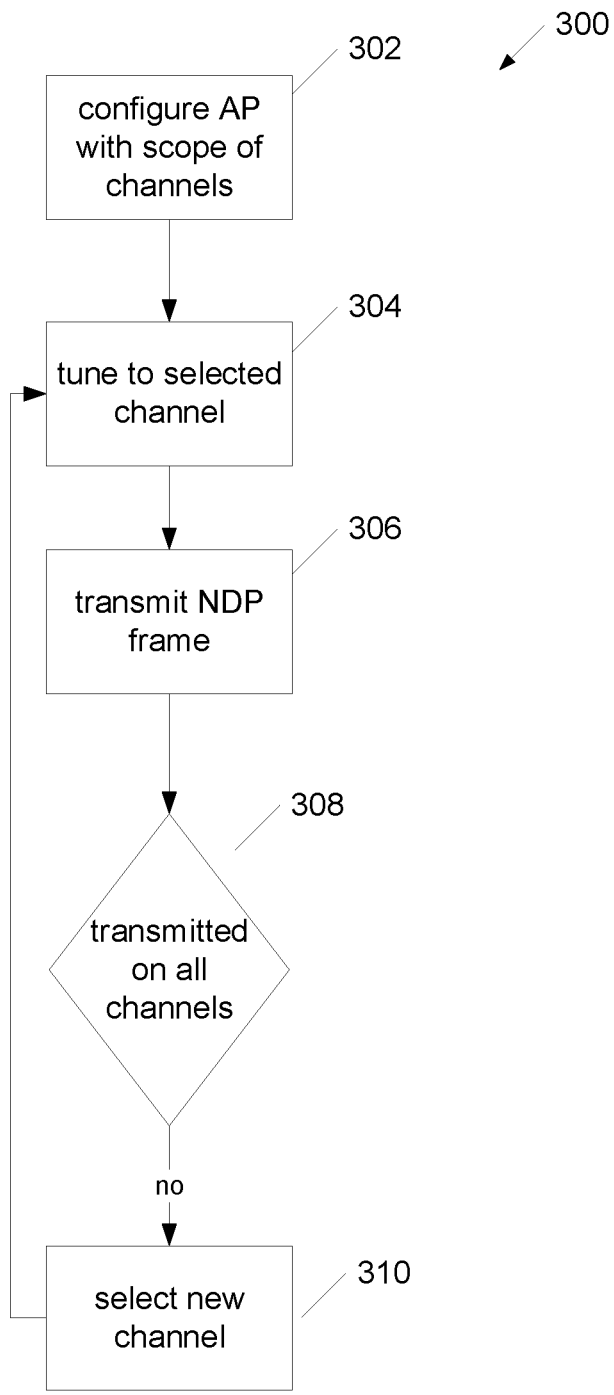
FIG. 3 is a flow diagram illustrating an example process for performing off-channel transmissions cycling.

FIG. 3 is a flow diagram illustrating an example process 300 for performing off-channel transmissions cycling. At 302, the AP device 102a may be configured with a scope of channels through which to cycle. For example, the AP device 102a may be configured to cycle through all regulatory channels. The AP device 102a may be configured to scan and audit all channels. The configuration of the AP device 102a may be stored, for example, in a radio profile.

At 304, the AP device 102a may cause its radio to select and tune to a channel in the scope of channels. At 306, the AP device 102a may transmit a neighbor discovery packet (NDP) frame. The NDP frame may include information that may be used in establishing a connection. This information may include TBTT information. Neighboring AP devices, e.g., the AP device 102b, may receive TBTT information of the radios of the AP device 102a regardless of the channel on which the neighboring AP devices may operate. When a neighboring AP device 102 receives TBTT information from the AP device 102a, it may embed the TBTT information in a fast initial link setup (FILS) discovery frame, which may be transmitted. Accordingly, TBTT information for the AP device 102a, as well as other AP devices 102, may be propagated throughout the network 100 via NDP and/or FILS discovery frames.

At 308, the AP device 102a may determine whether it has transmitted on all of the channels in its configured scope of channels. If so, the process 300 may end. If not, the AP device 102a may select a new channel at 310 and may tune to the selected channel at 304. An NDP frame may be transmitted.

In some implementations, a radio of the AP device 102a may advertise TBTT information using on-channel transmissions of a timing synchronization frame (e.g., a neighbor discovery packet, FILS discovery frame, beacon, dummy probe response) at a reduced interval. Transmitting messages at a reduced interval may increase the likelihood that a message may be received by an off-channel receiver of a neighboring node. The radio may advertise TBTT information in this manner without conducting off-channel transmissions. Off-channel transmissions may add overhead. TBTT information may be added to a data packet. In some implementations, the TBTT information may be included as a time stamp similar to a time stamp that may form part of a beacon. An AP device may know the time stamps and target beacon transmission times of its neighbors. A receiving AP device may acquire time stamp information without moving out of its own operating channel. The receiving AP device may instead receive a data packet from a neighboring node while operating normally and extract the TBTT information from the received data packet.

In some implementations, the AP device 102a may use a probe response frame to send a timing synchronization function (TSF) value to neighboring AP devices. For example, the AP device 102a may transmit a dummy probe response-to-self at predetermined intervals. The probe response frame may have a medium access control (MAC) header. The MAC header may include a destination address (DA). The AP device 102a may use specific (e.g., reserved) values in the destination address to indicate to other AP devices that the probe response frame is a dummy probe response, e.g., rather than a probe response transmitted in response to a probe request.

Figure 4:
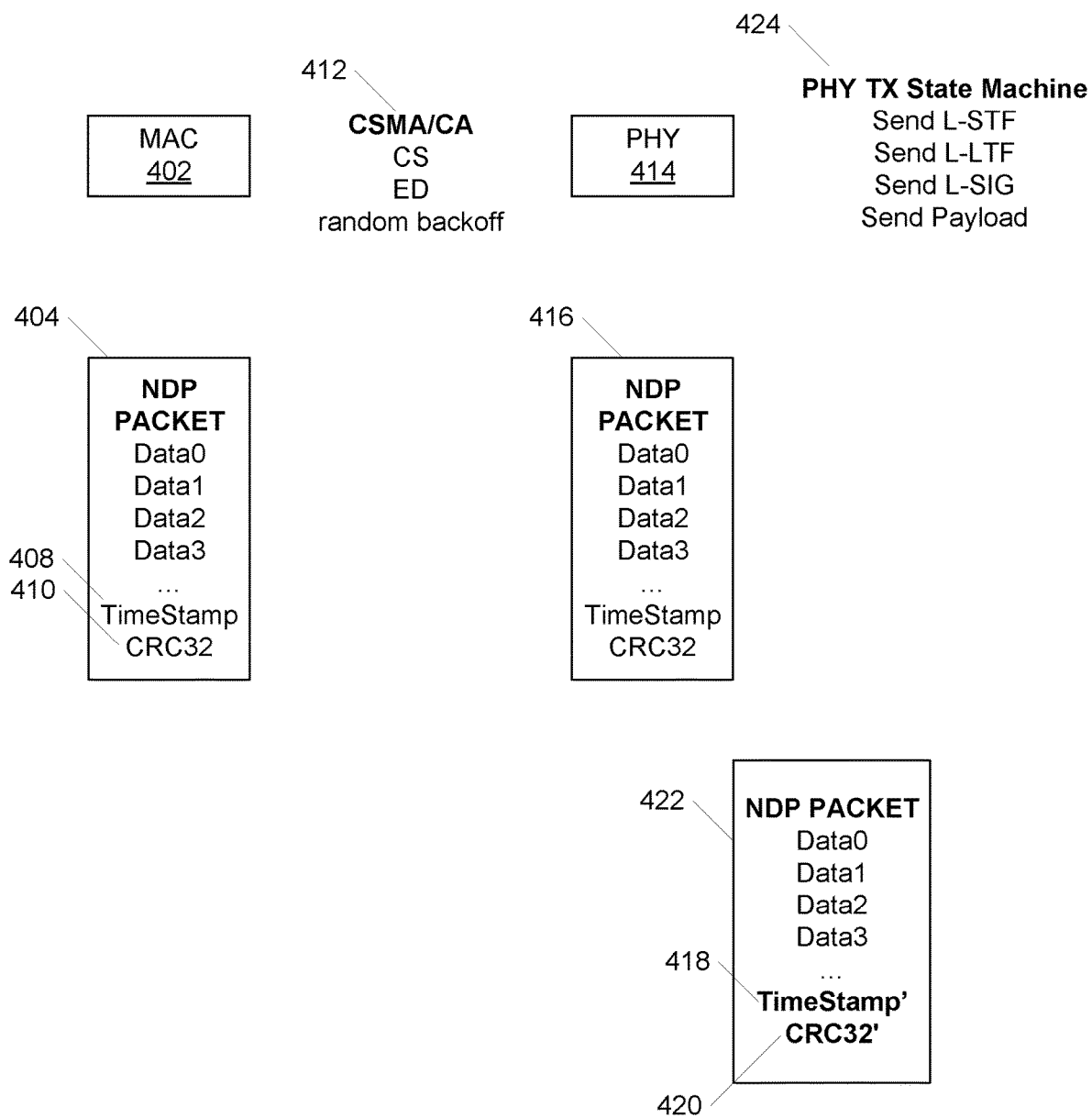
FIG. 4 is a diagram that illustrates an example process of overwriting a physical layer convergence procedure (PLCP) service data unit (PSDU).

In some implementations, a physical layer convergence procedure (PLCP) service data unit (PSDU) may be intercepted and/or overwritten. A software medium access control (MAC) layer, a hardware MAC layer (e.g., that may be configured), and/or a software defined radio (SDR) physical (PHY) layer may be used to intercept and/or overwrite the PSDU. FIG. 4 illustrates an example process of overwriting a PSDU. A MAC layer 402 may receive a packet, e.g., a neighbor discovery packet (NDP) 404. The NDP 404 may include data 406, a time stamp 408, and/or a cyclic redundancy check (CRC) value 410, e.g., a CRC32 value. It will be appreciated that the MAC layer 402 may receive other types of timing synchronization frames including TBTT information, such as FILS discovery frames, beacons, dummy probe responses, and the like.

At 412, a device may access a channel, for example, using carrier sense multiple access (CSMA) with collision avoidance (CSMA/CA). A physical radio interface 414 may sample a wireless medium to determine whether a channel is busy or idle. Energy detection (ED) may be performed. A random backoff timer may be used to avoid collisions.

At 416, when the channel access is complete, the MAC layer 402 and/or the PHY layer 414 may intercept the NDP 404. At 418, an updated time stamp value may be generated. At 420, a CRC value, e.g., a CRC32 value, may be recalculated for the NDP 404 with the updated time stamp. The NDP with the updated time stamp and CRC value may be sent in a frame at 422. This may reduce or remove the jitter in time stamps between AP devices that may result from a (e.g., potentially significant) time lag between queuing the frame in higher layers and the actual transmission time of the frame after channel access.

A physical transmit state machine may be updated at 424. Legacy preamble fields may be sent. A legacy short training field (L-STF) may be sent. A legacy long training field (L-LTF) may be sent. A legacy signal (L-SIG) may be sent. A payload may be sent. The L-STF, L-LTF, and L-SIG may be sent over a duration of, for example, 20 microseconds, allowing the time stamp to be updated and the CRC to be recalculated before the payload is sent.

In some implementations, a wireless local area network (WLAN) controller may execute a centralized algorithm that may promote time synchronization accuracy between AP devices 102 in the wireless network 100. The WLAN controller may receive time stamp mismatch information collected by each AP device 102. This time stamp mismatch information may include a timing advance (TA) field of a PPDU received from a neighboring AP device. The time stamp mismatch information may include a timing synchronization function (TSF) value included in a frame (e.g., a beacon frame, a probe response frame, and/or a mini beacon frame) received from a neighboring AP device. The time stamp mismatch information may include a local TSF value at the receiving AP device.

In some implementations, if a TSF value may not be included in an NDP, an AP device transmitting an NDP may record its MAC address and the local TSF value at the time of transmission. The receiving AP device may record the TA value of the NDP and the local TSF value at the time of reception. These records may be sent to the WLAN controller.

The WLAN controller may use error minimization techniques to identify differences between local oscillators in the AP devices 102. For example, the WLAN controller may use Kalman filters, least squares, and the like. Time offset information (e.g., the time offset between a given AP device and a reference AP device and the rate of change of the time offset) may be sent to the AP devices 102. The AP devices 102 may use this time offset information to predict future timing mismatches.

Figure 5:
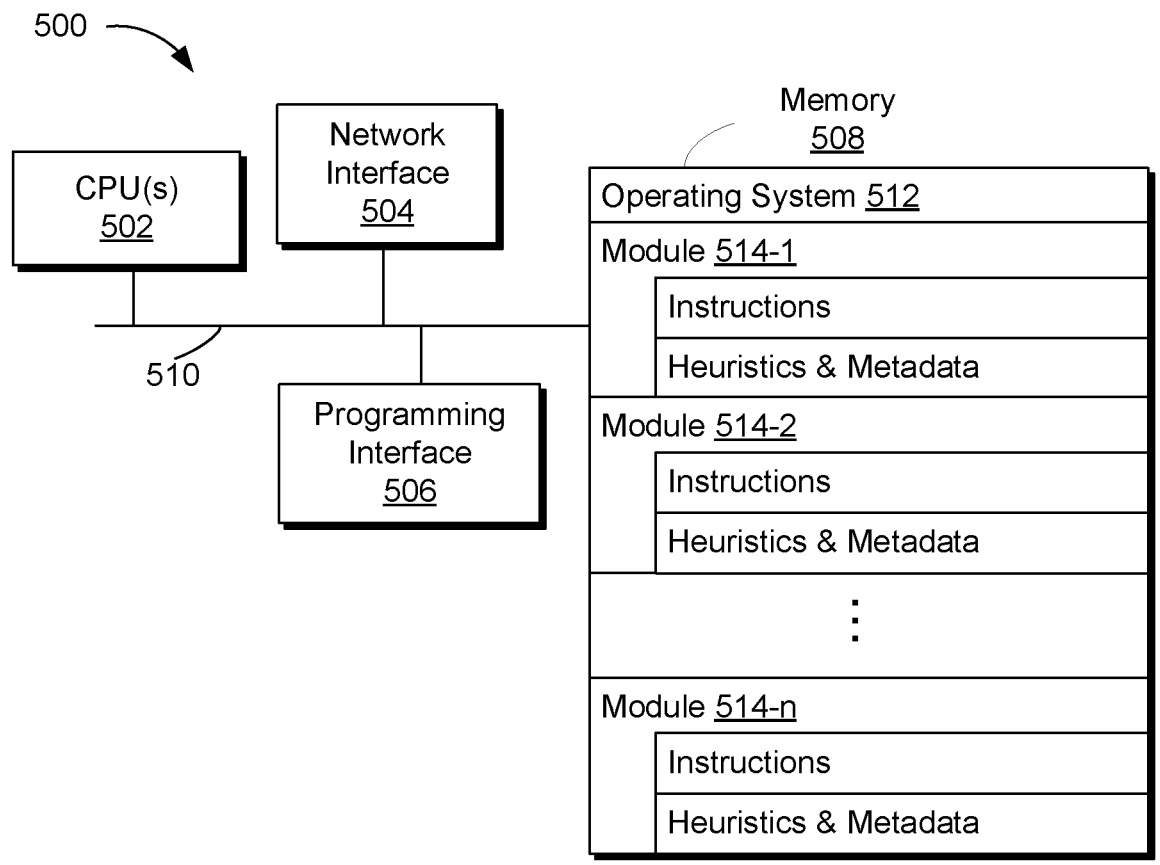
FIG. 5 is a block diagram that illustrates an example server system.

FIG. 5 is a block diagram of an example server system 500 enabled with one or more components of a device, server, or system in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 may include one or more processing units (CPUs) 502, a network interface 504, a programming interface 506, a memory 508, and one or more communication buses 510 for interconnecting these and various other components.

The network interface 504 may be provided to, among other uses, establish and/or maintain a metadata tunnel between a cloud-hosted network management system and at least one private network including one or more compliant devices. In some implementations, the communication buses 510 may include circuitry that interconnects and controls communications between system components. The memory 508 may include one or more of high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. The memory 508 may include one or more storage devices remotely located from the CPU(s) 502. The memory 508 may comprise a non-transitory computer readable storage medium.

In some implementations, the memory 508 or the non-transitory computer readable storage medium of the memory 508 may include (e.g., store) the following programs, modules, and data structures, or a subset thereof including one or more of an operating system 512 or various modules 514-1, 514-2 . . . 514-n. The modules 514-1, 514-2 . . . 514-n, individually and/or collectively, perform one or more of the operations described herein. To that end, in various implementations, the modules 514-1, 514-2 . . . 514-n may include respective instructions and/or logic, and heuristics and metadata.

Various aspects of implementations within the scope of the appended claims are described above. It should be apparent that the various features of implementations described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    generating, at a first wireless access point (AP) device, a timing synchronization frame comprising a target beacon transmission time (TBTT) value associated with the first wireless AP device;
    transmitting the timing synchronization frame to a second wireless AP device; and
    transmitting a network message comprising the TBTT value associated with the first wireless AP device from the second wireless AP device to a wireless station (STA), wherein the TBTT value can be used by the STA to facilitate discovering at least one of the first or second wireless AP devices.

2. The method of claim 1, wherein the timing synchronization frame comprises a beacon frame.

3. The method of claim 1, further comprising:
    configuring the first wireless AP device with a plurality of channels in a regulatory domain; and
    transmitting the timing synchronization frame on each channel of the plurality of channels, the timing synchronization frame comprising the TBTT value associated with the first wireless AP device.

4. The method of claim 1, wherein the timing synchronization frame comprises a neighbor discovery packet (NDP) comprising a time stamp.

5. The method of claim 1, wherein the timing synchronization frame comprises a probe response frame comprising a timing synchronization function (TSF) value.

6. The method of claim 5, wherein the probe response frame comprises a destination address having a value indicating that the probe response is a dummy probe response.

7. The method of claim 1, further comprising:
    receiving a physical layer convergence procedure (PLCP) service data unit (PSDU) comprising a time stamp value and a cyclic redundancy check (CRC) value;
    determining an updated time stamp value and an updated CRC value based on the updated time stamp value; and
    overwriting the PSDU with the updated time stamp value and the updated CRC value.

8. The method of claim 1, further comprising:
    receiving time offset information associated with the second wireless AP device from a wireless controller, the time offset information being determined as a function of time stamp mismatch information associated with a plurality of wireless AP devices; and
    predicting a timing mismatch between the first wireless AP device and the second wireless AP device based on the received time offset information.

9. The method of claim 8, wherein the time offset information comprises at least one of a time offset between the first wireless AP device and the second wireless AP device or a rate of change of the time offset.

10. A first wireless access point (AP) device comprising:
    an antenna;
    a network interface in communication with a network;
    a processor configured to execute computer readable instructions included on a non-transitory memory; and
    a non-transitory memory including processor-readable instructions, that when executed by the processor, cause the device to:
        generate a timing synchronization frame comprising a target beacon transmission time (TBTT) value associated with the first wireless AP device; and
        transmit the timing synchronization frame to a second wireless AP device, wherein the second wireless AP device is configured to transmit a network message comprising the TBTT value associated with the first wireless AP device to a wireless station (STA), wherein the TBTT value can be used by the STA to facilitate discovering at least one of the first or second wireless AP devices.

11. The first wireless AP device of claim 10, wherein the timing synchronization frame comprises a beacon frame.

12. The first wireless AP device of claim 10, wherein the processor-readable instructions cause the device to:
    configure the first wireless AP device with a plurality of channels in a regulatory domain; and
    transmit the timing synchronization frame on each channel of the plurality of channels, the timing synchronization frame comprising the TBTT value associated with the first wireless AP device.

13. The first wireless AP device of claim 10, wherein the timing synchronization frame comprises a neighbor discovery packet (NDP) comprising a time stamp.

14. The first wireless AP device of claim 10, wherein the timing synchronization frame comprises a probe response frame comprising a timing synchronization function (TSF) value.

15. The first wireless AP device of claim 14, wherein the probe response frame comprises a destination address having a value indicating that the probe response is a dummy probe response.

16. The first wireless AP device of claim 10, wherein the processor-readable instructions cause the device to:
    receive a physical layer convergence procedure (PLCP) service data unit (PSDU) comprising a time stamp value and a cyclic redundancy check (CRC) value;
    determine an updated time stamp value and an updated CRC value based on the updated time stamp value; and
    overwrite the PSDU with the updated time stamp value and the updated CRC value.

17. The first wireless AP device of claim 10, wherein the processor-readable instructions cause the device to:
    receive time offset information associated with the second wireless AP device from a wireless controller, the time offset information being determined as a function of time stamp mismatch information associated with a plurality of wireless AP devices; and
    predict a timing mismatch between the first wireless AP device and the second wireless AP device based on the received time offset information.

18. The first wireless AP device of claim 17, wherein the time offset information comprises at least one of a time offset between the first wireless AP device and the second wireless AP device or a rate of change of the time offset.

19. A non-transitory computer readable storage medium storing one or more programs, the one or more programs comprising instructions, which, when executed by a computing device with a non-transitory memory and one or more processors, cause the computing device to perform or cause performance of:
    generating, at a first wireless access point (AP) device, a timing synchronization frame comprising a target beacon transmission time (TBTT) value associated with the first wireless AP device; and
    transmitting the timing synchronization frame to a second wireless AP device, wherein the second wireless AP device is configured to transmit a network message comprising the TBTT value associated with the first wireless AP device to a wireless station (STA), wherein the TBTT value can be used by the STA to facilitate discovering at least one of the first or second wireless AP devices.

20. The non-transitory computer readable storage medium of claim 19, wherein the instructions cause the computing device to perform or cause performance of:

configuring the first wireless AP device with a plurality of channels in a regulatory domain; and transmitting the timing synchronization frame on each channel of the plurality of channels, the timing synchronization frame comprising the TBTT value associated with the first wireless AP device.

* * * * *